This application is a continuation in part of application Number 58,179 filed September 26, 1960, now Patent Number 3,108,860.

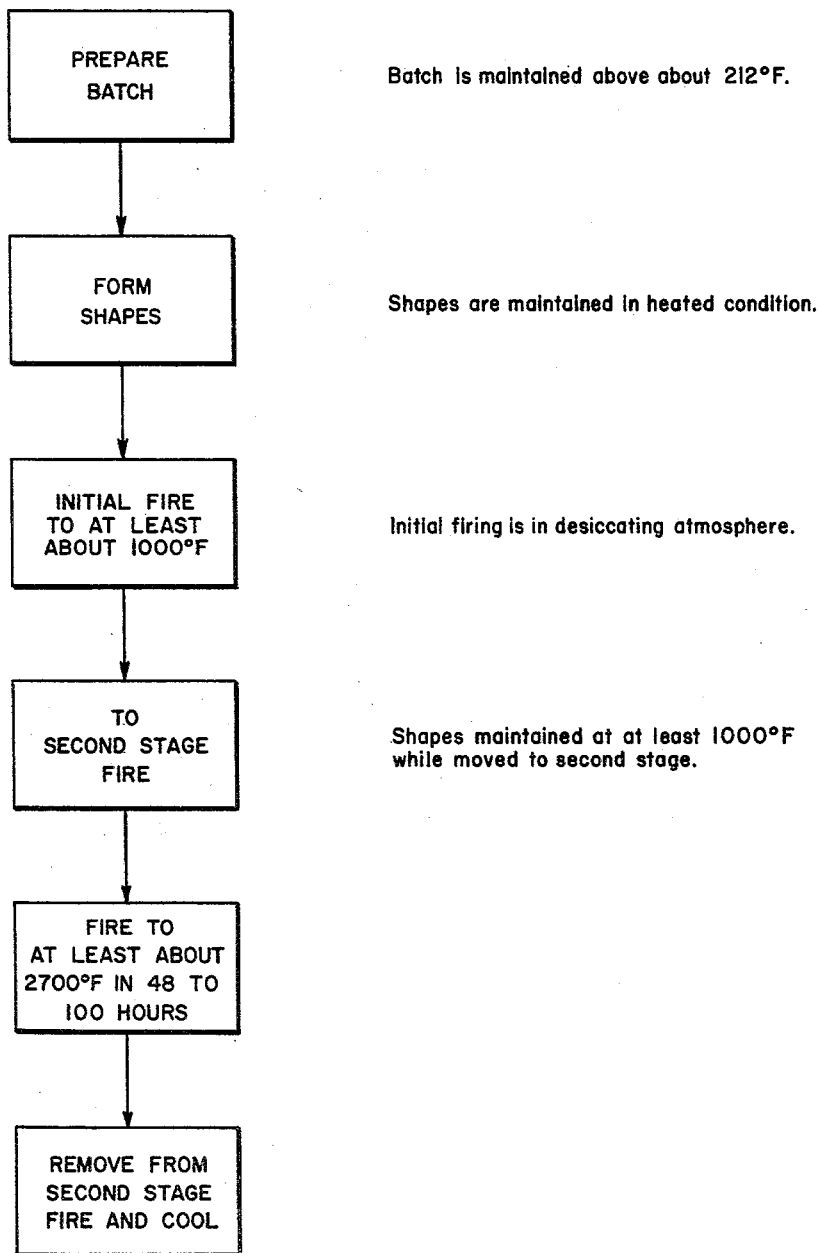
INVENTORS.
BEN DAVIES &
OSCAR MILTEN WICKEN
BY
ATTORNEY 3,196,193
FIRING OF LIME AND DOLOMITE SHAPES
Ben Davies and Oscar Milton Wicken, Pittsburgh, Pa.,
assignors to Harbison-Walker Refractories Company,
Pittsburgh, Pa., a corporation of Pennsylvania
Filed Aug. 26, 1963, Ser. No. 304,609
The portion of the term of the patent subsequent to
Oct. 29, 1980, has been disclaimed
10 Claims. (Cl. 264—58)

This invention relates to the manufacture of ceramically bonded shapes, such as refractory brick, which contain at least 50%, by weight, of CaO on the basis of an oxide analysis. It is a primary object of the invention to provide an improved and more easily practiced manner of firing all-dolomite refractory shapes, whereby a dense, burned body of adequate hydration resistance is obtained.

The problems involved in the manufacture of dolomitic limestone or dolomite brick are well known in the art. Most of the problems are based on the distressing affinity which each of these materials has for moisture, with concomitant disintegration due to hydration. In fact, these materials are known to disintegrate to a pile of rubble upon mere exposure to the atmosphere for very short periods of time. Repeated attempts have been made to inhibit the reaction between high lime content dolomitic materials and atmospheric moisture, to thereby take advantage of the exceedingly high melting point and, thus, excellent refractoriness of CaO (hard burned life) and CaO·MgO (dead burned dolomite).

By way of term definition, when we herein refer to dolomite, we intend to describe the natural mineral dolomite, which has on the order of a 1:1 molar ratio of $MgCO_3$ and $CaCO_3$; and which, when heated with or without flux material (sometimes termed dead burning agents or additives) to a temperature sufficiently high and for a long enough period of time to decompose the carbonate structure and drive off all free and substantially all chemically combined water, yields a mixture of calcium oxide and magnesium oxide termed "dead burned dolomite" in the art. It is the primary purpose of this invention to provide such dead burned dolomite, in the form of ceramically bonded shapes characterized as being a mixture of calcium oxide and periclase, in a matrix that provides resistance to subsequent hydration and recarbonation with carbon dioxide when exposed to the atmosphere.

As noted, the addition of materials, sometimes called dead burning agents, such as, for example, iron oxide, silica and clay, has been suggested to stabilize dolomite against hydration; but these chemical additives have tended to reduce the refractoriness which one can obtain from high purity dolomite.

It is the actual step of firing that appears to have precluded the prior commercial production of dense, burned, high purity dolomite and lime refractory bodies. Hydration of dolomite and lime bodies, when heated in the manner conventionally employed for other basic refractory brick, has proceeded so rapidly that usable product is not recoverable. The minor amount of water present in the fuels used, particularly in oil fired kilns, turns to steam and, in part, is the cause of hydration and disintegration of the brick or shapes. In any event, the brick always seem to be severely cracked.

Various prior art methods have been proposed for overcoming the problems of fabricating shapes of dead burned dolomite. The patent literature is replete with disclosure of the long-felt need in the art. Most of the patent literature is concerned with stabilization of the lime content of dolomite or of lime alone, as a means by which fired shapes can be made therefrom. For example, Richter, No. 149,338, shows stabilizing lime with mica; Livingston, No. 241,034, shows stabilizing lime with silica; Newberry, No. 677,688, teaches stabilizing dolomite with clay; Jones, No. 1,251,535, discloses stabilizing dolomite with blast furnace flue dust; Kennedy, No. 1,238,020, shows stabilizing dolomite with silica and iron oxide and/or alumina; Newberry, No. 1,267,686, discloses stabilizing dolomite with alumina and iron oxide; Baker, Nos. 1,063,- 102 and 1,063,103, disclose stabilizing dolomite through particular burning; Newberry, No. 1,400,087, shows stabilizing lime with clay; Ernould, No. 2,076,883, shows stabilizing lime with iron oxide or chromium oxide; Syz, No. 2,380,480, teaches stabilizing dolomite with fluorides; Fisk, No. 2,528,471, suggests stabilizing lime with titanium dioxide; Hathaway, No. 2,678, 887, discloses stabilizing lime with zirconia and titania; Whittemore, No. 2,876,122, shows stabilizing lime by fusing with magnesia; and McAllister, No. 2,916,389, uses magnesia and iron oxide to stabilize lime.

The foregoing patents represent a span of about 75 years, in which attention has been fruitlessly applied to finding means to change or treat the CaO content of dolomite, so that hydration would not occur, while still retaining refractoriness. As pointed out, fluxes, in particular irony fluxes and the like, while promoting hydration resistance, seriously affect the refractoriness which can be expected from the high CaO content material that dolomite is.

In the recently issued patent of Renkey, No. 2,971,240, owned by the same assignee as the instant invention, a new approach to the problem was advanced. In that patent, dolomite and lime bodies were subjected to flash firing, i.e., the bodies were heated at such a rate as to reach 1000° F. within five minutes; and, in this manner, deleterious hydration was avoided. Such practice has produced acceptable brick. As noted in copending application Serial No. 58,179, of Davies et al., also owned by the same assignee as the instant invention, the flash firing of the Renkey patent had certain practical difficulties which are absent when more normal burning schedules are employed. By normal burning schedules, we mean much slower than the flash firing suggested in Renkey. The probable need for special kilns is, of course, also immediately apparent; and the efficiencies resulting from the use of standard temperature schedules, or at least much slower temperature schedules, cannot be achieved. Thus, in the copending Davies et al. application, there is taught a method of firing dolomite and lime refractory shapes without the necessity of flash firing or incorporating stabilizing additives in the brickmaking batches; and which, in essence, consists of the remarkably simple step of firing the shapes at conditions determined to minimize the amount of moisture that is in contact with the shapes, during the significant time period during which the shapes are heated to about 1000° F. Above this temperature, material hydration simply did not occur; and the resultant fired product was free of cracks, and had good hydration resistance under normally moist atmospheric conditions.

However, even this latter method is not all that might be desired, because of practical limitations on the quantity of shapes which can be manufactured in a given time period. It is the primary purpose of this invention to provide a method of fabricating high lime or dolomite shapes, on a much more economical and commercial scale than has heretofore been considered possible.

Briefly, in one embodiment, the process of this invention is comprised of burning dolomite shapes in a modified tunnel kiln, carefully controlling the heating rates for the shapes as they pass through the tunnel kiln, and by special attention to the manner in which the shapes are prepared for a burn in the kiln. The kiln is, in essence, a two-stage one, the first of which is provided with means to heat the shapes in a desiccated atmosphere at a rate slow enough to prevent breakage (on the order of 200° F. per hour) to a temperature of at least about 1000° F. and, preferably, at least about 1200° F. Immediately upon reaching this temperature, the shapes are passed to the atmosphere of a normal tunnel kiln, which is operated on an easily controlled firing schedule. This schedule is firing or burning the shapes at a temperature within the range 2700 to 3200° F. The total firing time is variable, and determined by the experience of the kiln operator; but would be on the order of 48 to 100 hours, not including allowance for cooling time. The manner in which the brick are loaded on the kiln cars deserves special care. It is essential that there be no face to face contact between brick. This can be assured by standing the brick one high on edge on a kiln car, which has been heavily sanded with refractory grain having a maximum diameter of about 3 mm. (48 mesh). With heavy sanding between adjacent brick faces, they may be stacked 5 or 10 high, for example, depending on the strength of the green brick. The grain must be physically inert to the firing temperatures, and to chemical reaction with the brick. A suitable refractory grain for the standing would be dead burned periclase, such as that manufactured according to U.S. Patent No. 3,060,000, owned by the same assignee as the instant invention.

The initial stage of a kiln suitable for practice of this invention, as noted, must be capable of heating the brick or shapes in a desiccated atmosphere. One manner in which this can be accomplished is to provide a firing chamber for this first stage which is sealed from the area in which the kiln cars pass. In such an instance, the cars and shapes are subjected to radiant heating. Alternatively, there can be air locks at the beginning and end of the initial heating stage, whereby it can be operated under positive pressure by recirculating desiccated combustion gases from the forward stages of the tunnel kiln, thereby excluding atmospheric moisture and obtaining a more economical heat balance about the kiln.

Electric heating, of course, suggests itself for this initial stage, or a hydrogen-free fuel such as coke or carbon monoxide could be used. Typical practice of the invention is exemplified in the following example, in which details are given by way of illustration, and are not to be construed as limiting the spirit and scope of the invention.

*Example*

A refractory batch is prepared of, essentially, 100% dead burned dolomite grain of the type manufactured according to the process of U.S. Patent No. 3,060,042, Leatham et al., owned by the same assignee as the instant invention. While the grain is still warm from manufactured by this process (at least about 212° F.), it is size graded to provide a brickmaking grind typically as follows:

| | Percent |
|---|---|
| −4+10 mesh | 15 |
| −10+28 mesh | 30 |
| −28+65 mesh | 15 |
| −65 mesh | 40 |

A nonaqueous bonding medium is added to the batch. Preferably, about 4 parts, by weight, of tar or pitch, which is recognized in the industry as useful for bonding basic refractory material, and 9 x 4½ x 2½″ brick are pressed from this tar bonded mix at about 8000 p.s.i. The brick are placed on a well sanded kiln car, assuring that there is no face to face contact between any of the brick. They are stacked, for example, five high with all brick top surfaces and the car top being thoroughly sanded with −48 mesh periclase grain. The loaded kiln cars are pressed to an initial heating chamber, which chamber has a desiccated atmosphere; and are subjected to a slow heating rate to assure no cracking, for example, on the order of 200° F. per hour, to a temperature of about 1200° F. As soon as the brick reach this temperature, the cars are moved to a normal tunnel kiln (by normal, we mean no special precautions are taken as to the necessity of a desiccated atmosphere) and heated to a temperature of about 3000° F. in about 100 hours. The brick are allowed to cool and are removed from the kiln at a temperature on the order of about 250° F., at which time they are dipped in a liquified tar-pitch mixture to coat them and give them still further shelf life than would be expected without such a coating. Other water repellent coating materials are, of course, possible. For example, machine oil can be used.

The brick of this example will have a lime content of at least about 53 to 59%, an ignition loss which is less than about 1%, an apparent porosity of less than 20%, and a bulk density minimum of about 166 p.c.f.

In the foregoing discussion, all parts and percentages are by weight, and chemical content is given on the basis of an oxide analysis, in conformity with the conventional practices of reporting the chemical content of refractory materials. All mesh sizes are according to the Tyler standard series of screens, unless specifically stated to the contrary.

As noted above, this invention allows the commercial production of ceramically bonded, high purity, dolomite brick having very good resistance to hydration. A primary purpose of the invention is to allow production of such brick from very high purity grain, without requiring the addition of various so-called dead burning agents. And while the character of the grain does not form a part of this invention, the following is set forth in the interest of assuring a complete disclosure. We know that minor amounts of such materials as dead burning agents can be added to the grain used to make the brick subjected to our process, if one so desires; and our process still will produce brick superior to other methods of manufacturing from the same grain, despite the addition of such materials. As a practical matter, though, the $R_2O_3$ components ($Fe_2O_3$, $Cr_2O_3$ and $Al_2O_3$) of the batch, including the dead burning additives, should be less than 2%; although the batch can contain as much as 5% $SiO_2$, to still obtain good density and porosity, as discussed above. Further, it is important that the ignition loss of the grain, which is used to make the shapes of this invention, be no more than 1% and, preferably, be less than about .2%. Also, the porosity of the grain used to make the brick should be no more than 8%, for best results; although porosity as high as 10% is acceptable.

While we discuss the use of a nonaqueous bonding material for the batch which is used to make the green brick to be fired by our process, we know of practices in which brick can be made from grain without using any bonds; and such shapes would, also, obviously be amendable to firing according to this invention, to produce hydration-resistant shapes. The requirements for this no-bond manufacturing technique are, in essence, extremely high pressures, i.e. above 15,000 p.s.i., and hot mixes, i.e. above 600° F.

Having thus described the invention in detail and with sufficient particularity as to enable those skilled in the art to practice it, what is desired to have protected by Letters Patent is set forth in the following claims.

We claim:

1. The process of preparing a burned refractory shape from dead burned dolomite grain which comprises preparing a batch of dead burned dolomite grain which is maintained at a temperature of above about 212° F., and forming this heated batch into shapes, placing the heated shapes on kiln cars while assuring no face to face contact between said shapes, moving the loaded car into an initial kiln treatment stage, in which the shapes are heated to a temperature of at least about 1000° F. in a desiccating atmosphere at a temperature rate slow enough to assure no cracking, removing the car and shapes from the desiccating atmosphere and moving them to a second stage while they are still at at least about 1000° F., firing said shapes in the second stage to a temperature of at least about 2700° F. in from 48 to 100 hours, removing the shapes from this second stage, and cooling them.

2. The method of claim 1 in which shapes are placed on said car in stacked relation.

3. The process of claim 1 in which the heating rate in the desiccating atmosphere is about 200° F. per hour.

4. The process of preparing a burned refractory shape from basic refractory grain consisting essentially of MgO and CaO and in which the CaO content is at least about 50%, by weight, which comprises preparing a batch from the grain while preventing hydration thereof, and forming the batch into shapes, placing the shapes on support means while assuring no face to face contact between said shapes, moving the loaded support means into an initial treatment stage, in which the shapes are heated to a temperature of at least about 1000° F. in a desiccating atmosphere at a temperature rate slow enough to assure no cracking, removing the support means and shapes from the desiccating atmosphere and moving them to a second stage while they are still at at least about 1000° F., firing said shapes in the second stage to a temperature of at least about 2700° F. in from 48 to 100 hours, and recovering the burned shapes.

5. The process of claim 4 in which the burned shapes are coated with a water repellent material.

6. The process of claim 4 in which face to face contact between the support means and the shapes is achieved by heavily sanding the support means supporting surface with −48 mesh refractory grain physically inert to the subsequent heat treating temperatures and which is chemically inert to the shapes during their passage through the two heat treating stages.

7. The process of claim 4 in which the shapes enter the second stage immediately after reaching 1000° F.

8. The process of preparing a burned refractory shape from dead burned dolomite grain which comprises preparing a batch of dead burned dolomite grain which is maintained at a temperature of above about 212° F. and forming this heated batch into shapes, placing the heated shapes on kiln cars while assuring no face to face contact between said shapes, moving the loaded car into an initial kiln treatment stage, in which the shapes are heated to a temperature of at least about 1000° F. in a desiccating atmosphere at a temperature rate slow enough to assure no cracking, removing the car and shapes from the desiccating atmosphere and moving them to a second stage while they are still at at least about 1000° F., firing said shapes in the second stage to a temperature of at least about 2700° F. to 3200° F. in from 48 to 100 hours, removing the shapes from this second stage, and cooling them.

9. The process of preparing a burned refractory shape from dead burned dolomite grain which comprises preparing a batch of dead burned dolomite grain which is maintained at a temperature of above about 212° F. by mixing the grain with about 4%, by weight based on the weight of the refractory batch, of a liquid carbonaceous bonding material and forming the resulting batch into shapes, placing the shapes on cars while assuring no face to face contact between said shapes, moving the loaded car into an initial kiln treatment stage, in which the shapes are heated to a temperature of at least about 1000° F. in a desiccating atmosphere at a temperature rate slow enough to assure no cracking, removing the car and shapes from the desiccating atmosphere and moving them to a second stage while they are still at at least about 1000° F., firing said shapes in the second stage to a temperature of at least about 2700° F. in from 48 to 100 hours, and removing the shapes from this second stage.

10. The process of preparing a burned refractory shape from basic refractory grain consisting essentially of MgO and CaO and in which the CaO content is at least about 50%, by weight, which comprises preparing a batch from the grain while preventing hydration thereof, and forming the batch into shapes, placing the shapes on support means while assuring no face to face contact between said shapes, moving the loaded support means into an initial treatment stage, in which the shapes are shielded from deleterious hydration while being heated to a temperature of at least about 1000° F. in a desiccating atmosphere at a temperature rate slow enough to assure no cracking, removing the support means and shapes from the desiccating atmosphere and moving them to a second stage while they are still at at least about 1000° F., firing said shapes in the second stage to a temperature of at least above 2700° F. in from 48 to 100 hours, and recovering the burned shapes.

References Cited by the Examiner

UNITED STATES PATENTS

| | | | |
|---|---|---|---|
| 1,626,260 | 4/27 | Willetts | 264—57 |
| 2,876,122 | 3/59 | Whittemore | 206—50 |
| 2,971,240 | 2/61 | Renkey | 264—66 |
| 3,108,860 | 10/63 | Davies | 264—64 |

ROBERT F. WHITE, *Primary Examiner.*

ALEXANDER H. BRODMERKEL, *Examiner.*